United States Patent

Taguchi

[15] 3,677,149

[45] July 18, 1972

[54] INTERLOCKING DEVICE FOR THE EXPOSURE METER IN A CAMERA

[72] Inventor: Tatsuya Taguchi, Tokyo, Japan

[73] Assignee: Canon Kabushiki Kaisha, Tokyo, Japan

[22] Filed: July 23, 1970

[21] Appl. No.: 57,730

[30] Foreign Application Priority Data

July 28, 1969 Japan..................................44/71497

[52] U.S. Cl..............................................95/10 C, 95/64 D
[51] Int. Cl..........................................................G03b 9/02
[58] Field of Search..............................95/10 C, 64 C, 64 D

[56] References Cited

UNITED STATES PATENTS

| 3,374,718 | 3/1968 | Hochreiter | 95/10 C |
| 3,446,130 | 5/1969 | Engelsmann | 95/10 C |
| 2,894,439 | 7/1959 | Burger | 95/64 D |
| 2,952,199 | 9/1960 | Burger | 95/64 D |

Primary Examiner—Samuel S. Matthews
Assistant Examiner—Monroe H. Hayes
Attorney—Ward, McElhannon, Brooks & Fitzpatrick

[57] ABSTRACT

An interlocking device for the exposure meter in a camera includes a rotatable interlocking member engaging an exposure regulating member, a locking lever pivotally mounted on the interlocking member for rotation with the interlocking member, a needle scanning member engageable with the interlocking member and movable in response to the rotation of the interlocking member and the locking lever to scan the position of the needle of the exposure meter, and a fixed locking member. The locking lever is moved with respect to the interlocking member by the movement of the latter when the scanning member is stopped, and that movement of the locking lever is imparted to the fixed locking member without exerting any great force upon the needle of the photoexposure meter. Another embodiment further provides means to make the movement substantially linear of the lever which is moved by the exposure control interlocking pin provided at the lens. Moreover, means are provided for reducing the gap between the needle of the exposure meter and the stepped portion of the interlocking lever before exposure adjustment.

3 Claims, 4 Drawing Figures

PATENTED JUL 18 1972 3,677,149

INTERLOCKING DEVICE FOR THE EXPOSURE METER IN A CAMERA

BACKGROUND OF THE INVENTION

1. Field of the Invention

This invention relates to a camera, and more particularly to an interlocking device for the exposure meter in a camera.

2. Description of the Prior Art

Devices are known for detecting the position of the needle of an exposure meter and transmitting the detection to an exposure regulating member to thereby automatically determine the exposure. In such a device, however, the needle of the photoexposure meter tends to be subjected to a great force when the needle scanning member is directly associated with the exposure regulation member. Thus, the needle of the meter had to be of rigid construction, but this lead to a reduced sensitivity of the ammeter.

SUMMARY OF THE INVENTION

The present invention intends to eliminate the described drawbacks existing in the prior art and prevent any great force from being exerted upon the needle of an exposure meter used with a camera.

To achieve this, the present invention provides an interlocking device for a self-contained exposure meter in a camera which comprises an interlocking member engaging an exposure regulating member, a locking lever pivotally mounted on said interlocking member, a needle scanning member engageable with said interlocking member, and a fixed locking member. The interlocking member and the locking lever are rotated together and the needle scanning member moves in response to the rotation of the interlocking member and the locking lever to thereby scan the position of the needle of the exposure meter. The locking lever is moved with respect to the interlocking member by the movement of the latter when the scanning member is stopped, and such movement of the locking lever is exerted upon the fixed locking member to thereby provide an abutment-like support.

Further, in an interchangeable lens type camera, there is provided various transmitting means between the lens and the camera for driving the stop from the camera side or for transmitting a signal of the exposure meter to the lens. Such transmitting device generally consists of an interlocking pin projected from the rear end of the lens barrel and a lever pivotally mounted on the camera body. In this case the leading end of the lever moves along circular lows which requires undesired space.

In accordance with this invention the leading end of the lever can move substantially linearly.

Furthermore, such an automatic exposure adjusting device has been used which interlocks the scanning member for scanning the rocking position of the needle of the exposure meter with the exposure adjusting member. In this case, it is necessary to prevent the scanning member from interfering with the rotation of the needle of the exposure meter by moving the scanning member away from the needle.

In accordance with a further aspect of this invention, there is a sufficient gap between the scanning member and the needle.

The invention will now be described by way of illustration in connection with the accompanying drawings.

DESCRIPTION OF THE PREFERRED EMBODIMENTS

Figure 1:
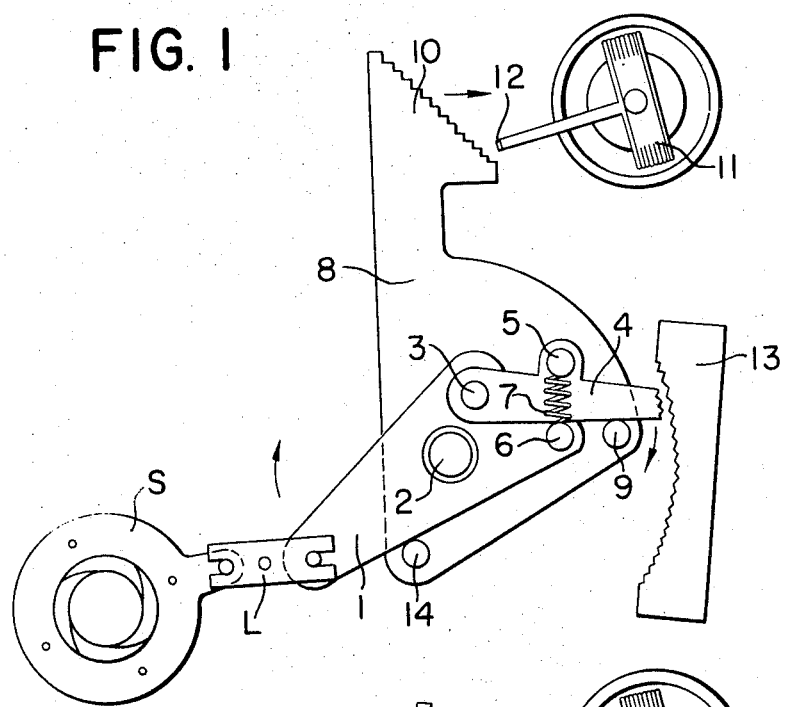
FIG. 1 is a plan view of the interlocking device for the exposure meter according to the present invention which shows the device in inoperative position.
Figure 2:
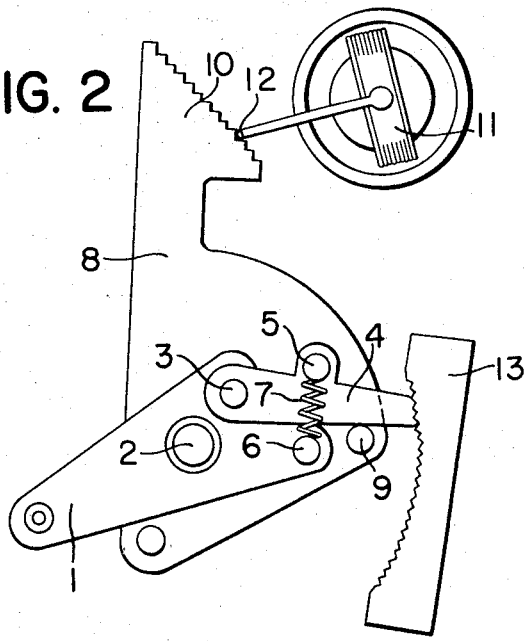
FIG. 2 is a similar view, but showing the interlocking device in operative position.

Referring to FIG. 1, a lever 1 is connected to a shutter device S or a shutter speed regulator (not shown) by means of a lever L. The lever 1 is rotatably mounted on a shaft 2 and has a shaft 3 studded therein. A locking lever 4 is pivotally mounted on the shaft 3 and has a shaft 5 studded therein.

From the shaft 5 to a pin 6 studded in the lever 1, there is extended a weak spring 7 so as to normally urge the locking lever 4 into engagement with the pin 6. A needle scanning member 8 is also rotatably mounted on the shaft 2 and it includes a studded pin 9 and a stepped cam portion 10 which scans the needle 12 of an ammeter 11. The scanning member 8 is further provided with a studded pin 14. Thus, the needle scanning member 8 is engaged at the pin 9 with the locking lever 4 and at the pin 14 with the interlocking lever 1. A fixed wall 13 having a saw-toothed arcuate surface is disposed in slightly spaced relationship with the path followed by the complementary saw-toothed tip end of the locking lever 4.

With this arrangement, when the interlocking lever 1 is rotated in the clockwise direction as shown by the arrow, the needle scanning member 8 is also rotated via locking lever 4, spring 7 and pin 9 until it is stopped upon engagement between the stepped cam portion 10 and the needle 12 of the ammeter 11. Thereupon, the position of the pin 9 is fixed while at substantially the same time the shaft 3 is moved with the rotation of the interlocking lever 1. This causes the locking lever 4 to move forward toward the fixed wall 13 against the force of the spring 7, whereby the toothed end of the locking lever 4 engages the toothed surface of the fixed wall 13 in an abutment-like fashion, thereby stopping the lever 1 from rotating. Thus, no excessive force is imparted to the needle 12 by the scanning member 8.

According to the present invention, as has been described above, the exposure regulating member 1 is moved together with the needle scanning member 8 by means of the locking lever 4 and stopped upon engagement of the scanning member 8 with the needle 12, whereupon the locking lever 4 moves forward toward the fixed wall 13 with the aid of the pin 9 serving as guide means, to thereby provide an abutment-like supporting force. Such arrangement of the present invention enables the ammeter needle and the locking member to be disposed remotely from each other, and this leads to a great advantage in designing the ammeter needle so as to be displayed within the finder of a camera. Also, the force exerted upon the interlocking member is of such a degree as to provide an abutment-like supporting force which ensures the exposure regulating member without malaffecting the needle of the ammeter, and this leads to the possibility of using an ammeter of good sensitivity.

Figure 3:
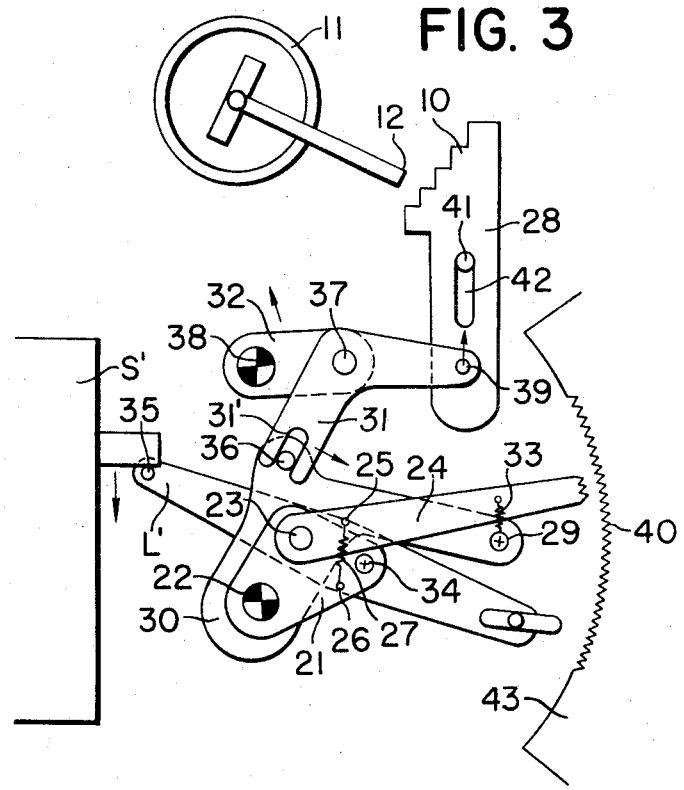
FIGS. 3 and 4 show another embodiment.
Figure 4:
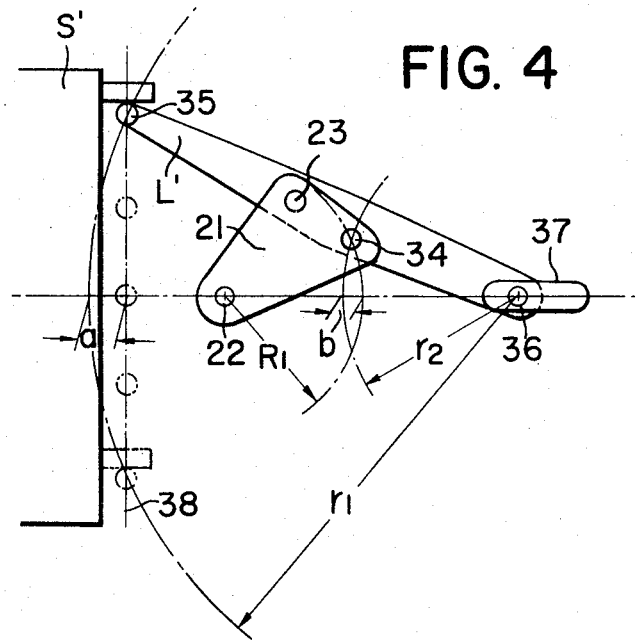

FIGS. 3 and 4 show another embodiment, of which FIG. 4 shows a portion of FIG. 3.

As shown in detail in FIG. 4, the difference between the radius of curvature $r_1$ of a lever L' and the ideal linear movement locus 38 is given by $a$ and the overlap amount between the radius of curvature $R_1$ of a shaft 34 around a shaft 22 and the radius of curvature $r_2$ of the shaft 34 around a pin 36 is given by $b$, then in this embodiment $a$ is substantially equal to $b$ so as to move the pin 35 substantially along the linear line 38.

Now referring to FIG. 3, as described before, when the lever 21 rotates clockwise around its pin 22, a locking lever 24, which always abuts a pin 34 by a spring 27, rotates clockwise so as to push a pin 29 to rotate a lever 30 clockwise which is pivotally mounted on the pin 22.

In an exposure meter, it is necessary to provide a gap between the position of the needle 12 of the exposure meter 11 and a stepped portion 10 of a scanning member 28 so as to separate the scanning member 28 away from the rotational path of the needle before the exposure adjustment starts. However in some prior art cases, it is not possible to provide such a gap at the initial position of the exposure adjusting member. In accordance with the embodiment shown in FIG.

3, it is possible, even at the initial position of the exposure adjusting member, as to provide a gap between the stopped cam portion 10 of the scanning member 28 and the needle 12 of the exposure meter 11. When the lever 30 rotates clockwise, a lever 31 rotates counterclockwise by a coupling of pin 36 and groove 31' around a pin 37 planted on a lever 32 pivotally mounted on fixed shaft 38, so that the needle scanning member 28 slides upwardly with the aid of a pin 39 connecting the lever 32 and the member 28 and a coupling consisting of a pin 41 and groove 42. Thus the gap between the cam portion 10 and the initial position of the needle reduces to zero, whereby the lever L' slightly moves and the regulating member is not actuated. When the needle is biased in the counter-clockwise direction the lever 30 further rotates and the pin 34 of the interlocking member 21 rotates clockwise. At that time, the pin 35, planted in the lever L' pivotally supported by the pin 34, moves linearly to displace the connecting pin of the exposure regulating member so as to control an amount of exposure. When the cam portion 10 of the scanning member 28 comes to be in engagement with the needle 12, the scanning member 28 is stopped and also the auxiliary lever 30 stops. Thereafter, as the lever 21 further rotates clockwise, the lever 30 can not rotate, but a locking lever 24 slides on the pin 29 rightwardly retaining the contact between the locking lever 24 and the pin 29 by means of a strong spring 33 until the leading edge of the lever 24 engages with a stepped cam portion 40 of a fixed wall 43.

What is claimed is

1. In a camera having a self-contained exposure meter and an exposure regulator for scanning the needle of the exposure meter to automatically determine the exposure, an interlocking device for the exposure meter comprising an interlocking member for connecting an exposure regulating member and a needle scanning member; a locking lever pivotally mounted on said interlocking member for movement in response to movement of said interlocking member; and a fixed locking member against which said locking lever abuts to limit movement of said interlocking member, said locking lever and said needle scanning member; said needle scanning member moving in response to the rotation of said interlocking member and said locking lever to thereby scan the position of said needle, said locking lever being moved relative to said interlocking member by the movement of the latter when said scanning member is stopped, said movement of said locking lever being arrested by said fixed locking member, thereby providing an abutment-like support.

2. An interlocking device for the exposure meter according to claim 1, the device further comprises a lever engaged at its one end with an exposure control interlocking pin provided at the exposure regulator, the lever being pivotally supported by said interlocking member and the other end of said lever being slidably moved within an elongated groove so as to move said one end of the lever substantially linearly.

3. An interlocking device for the exposure meter according to claim 1, the device further comprises an interconnecting member rotatably supported by another lever and pivotally connected to said needle scanning member, said needle scanning member having a groove engaged with a fixed pin, said interconnecting member having a groove, and connected to an auxiliary lever having a coupling pin slidably mounted in said groove, the rotational movement of said interlocking member being transmitted to the needle scanning member as a linear movement through said auxiliary lever and said interconnecting member so as to reduce the gap between the needle and the needle scanning member.

* * * * *

PO-1050
(5/69)

UNITED STATES PATENT OFFICE
CERTIFICATE OF CORRECTION

Patent No. 3,677,149 : Dated July 18, 1972

Inventor(s) TATSUYA TAGUCHI

It is certified that error appears in the above-identified patent and that said Letters Patent are hereby corrected as shown below:

Column 2, line 57, "R, of the shaft" should be --r, of a shaft--;

Column 3, line 2, "as to provide" should be --to provide--.

Signed and sealed this 20th day of March 1973.

(SEAL)
Attest:

EDWARD M. FLETCHER, JR.
Attesting Officer

ROBERT GOTTSCHALK
Commissioner of Patents